June 29, 1954 A. J. HUCK 2,682,602
THERMOSTAT FOR COOKERS
Filed Sept. 5, 1950
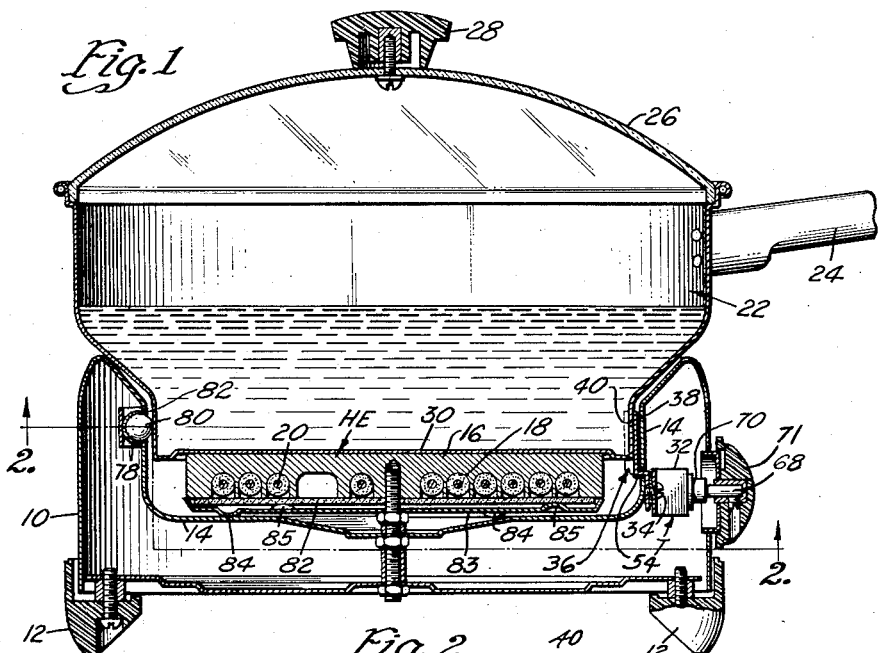
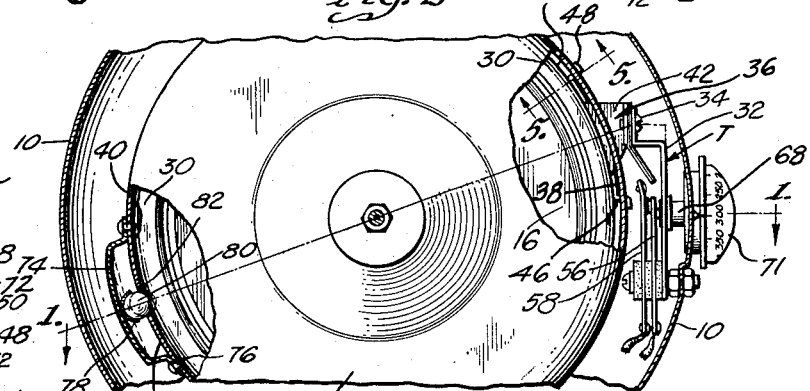
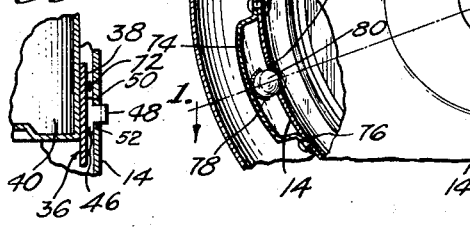
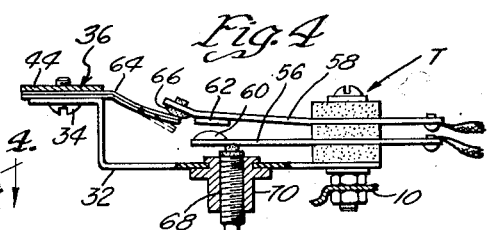
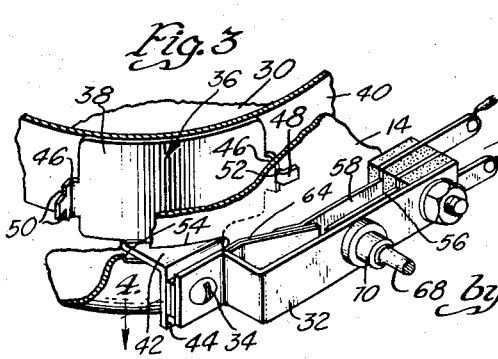
Inventor
Alfred J. Huck
by Bair, Freeman & Molinare
Attorneys Patented June 29, 1954

2,682,602

UNITED STATES PATENT OFFICE 2,682,602

THERMOSTAT FOR COOKERS

Alfred J. Huck, St. Louis, Mo., assignor to Knapp-Monarch Company, St. Louis, Mo., a corporation of Delaware Application September 5, 1950, Serial No. 183,269

3 Claims. (Cl. 219—43)

This invention relates to a thermostat particularly designed for those types of cookers wherein the cooking kettle is removable with relation to the heating element therefor.

One object of the invention is to provide a thermostat for this general type of cooker which is responsive to the temperature of the removable kettle and yet is mounted in the stationary base of the appliance along with the heating element for the kettle.

Another object is to provide an efficient means to cause accurate and reliable response of the thermostat to the kettle comprising a heat conductor bracket against which the kettle is engaged by resilient means.

A further object is to provide a heat conductor bracket at the side of the kettle so that the kettle is engaged laterally against it so that the bottom surface of the kettle efficiently contacts with the upper surface of a heating element which is not always possible with those types of thermostats that contact the bottom of the kettle.

With these and other objects in view, my invention consists in the construction, arrangement and combination of the various parts of my thermostat for cookers, whereby the objects contemplated are attained, as hereinafter more fully set forth, pointed out in my claims and illustrated in the accompanying drawings, wherein:

Figure 1 is a vertical sectional view through a cooker and illustrating my thermostat associated therewith.

Figure 2 is a sectional view on the line 2—2 of Figure 1, the line 1—1 of Figure 2 being the section line along which Figure 1 is taken.

Figure 3 is a perspective view of the thermostat, its heat conductor bracket and adjacent portions of the electrical appliance.

Figure 4 is a partial plan and partial sectional view on the line 4—4 of Figure 3 and shows the thermostat in the heated position; and Figure 5 is an enlarged sectional view on the line 5—5 of Figure 2 to illustrate details of the heat conductor bracket.

On the accompanying drawing I have used the reference numeral 10 to indicate a supporting casing for the appliance illustrated, insulating feet 12 being attached thereto for supporting the same above a table top or other supporting surface. The base 10 has a depressed portion 14 in which a heating element HE is provided. The heating element is preferably a metallic disc 16 of cast iron or the like having a smooth upper surface and a spirally grooved lower surface, the grooves being indicated at 18. An insulated resistance coil 20 is wound in the groove 18 and its ends are connected with suitable terminals in the usual manner.

The cooking kettle is shown generally at 22. It may be provided with a handle 24 and a removable cover 26 to which is secured a knob 28 for lifting the cover. The cooking kettle 22 is removable with relation to the base 10 and has a substantially flat bottom 30 to contact the upper surface of the heating element HE so that good heat conduction from the heating element to the kettle is had.

My thermostat is indicated generally at T and comprises a mounting bracket 32 secured by a screw 34 to a heat conductor bracket 36. The bracket 36 has a portion 38 formed to the contour of the side 40 of the cooking kettle 22 as illustrated in Figures 2 and 3. It also has an offset portion 42 terminating in an ear 44 to which the supporting bracket 32 is secured by the screw 34.

The heat conductor bracket 36 further has a pair of ears 46 at its ends terminating in tabs 48 beyond shoulders 50 of the ears 46 and the tabs extend through openings 52 in the depressed portion 14 of the base 10 and are bent over to retain the heat conductor bracket in the mounted position. The depressed portion 14 of the base 10 is also provided with a slot 54 through which the offset portion 42 of the bracket 36 extends, this opening being somewhat larger than the cross section of the bracket at this point to avoid heat conduction from the base portion 14 to the heat conductor bracket.

The thermostat in addition to the supporting bracket 32 includes contact springs 56 and 58 carrying contact points 60 and 62 respectively. These are normally engaged as illustrated in Figure 2 when the appliance is cold. A bimetal blade 64 is secured between the brackets 32 and 44 by the screw 34 and is adapted when heated to warp from the position of Figure 2 to the position of Figure 4 for engaging an insulating button 66 on the switch blade 58 to separate its contacts 62 from the contact 60.

The thermostat is adjustable by means of an adjusting screw 68 threaded in a boss 70 of the bracket 32. A control knob 71 is mounted on the adjusting screw 68 for rotating it and may be calibrated for temperature as between approximately 150° F. and 450° F.

The shoulders 50 on the heat conductor bracket 36 hold it spaced from the casing portion 14 as illustrated in Figure 2, the space being indicated at 72 in Figure 5. Thus there is a minimum of conduction from 14 to 36 with the major portion of the conduction being from the wall 40 of the vessel 22 through the bracket portion 38 and the bracket 36 to the bimetal 64 of the thermostat.

To retain the kettle wall 40 in close contact with the portion 38 of the heat conductor bracket 36, I provide a resilient means comprising a leaf spring 74 secured as by rivets 76 to the wall of the base 14 diametrically opposite the bracket 36. A cup 78 is carried by the spring 74 to hold a ball 80 that normally seats in an opening 82 of the wall 40 as shown by dotted lines in Figure 2, the opening being slightly smaller than the diameter of the ball.

The parts are so dimensioned that when the kettle 22 is in the position shown in Figures 1 and 2, however, the ball is pressed back to the full-line position and the resiliency of the spring 74 therefore comes into play for sliding the kettle 22 across the heating element HE and against the heat conductor bracket 36 to keep it in firm contact therewith regardless of the initial manual position of the kettle on the heating element. I am thus able to mount the thermostat T in the base 10 along with the heating element yet isolate it therefrom and cause it to respond almost 100% to the temperature of the kettle 22.

An appliance of the character disclosed is useful for many cooking operations such as warming buns, simmering liquids, browning buns, baking, corn popping, and deep fat frying. The thermostat with a temperature range between 150° F. and 450° F. is suitable for these operations in the order given from the low temperature setting to the maximum temperature setting.

My arrangement permits the kettle to be removed for serving and/or cleaning purposes yet reinserted in the appliance base with full assurance of proper response of the thermostat to its temperature. The arrangement is such that the heat conductor bracket is thermally isolated as well as possible from any source of heat other than the container temperature directly. To accomplish this, the heat conductor bracket is mounted at the side of the kettle and low with respect thereto so that it can be housed in the base for the kettle. The spring 74 and the ball 80 then provide a substantially frictionless method to bias the kettle sidewise toward contact with the heat conductor bracket without interfering with the proper surface contact between the bottom 20 of the kettle and the heating element HE. The bracket 36 thus responds predominantly to the kettle temperature, its construction being such that it is thermally isolated from although supported on the wall 14 of the appliance base so that it is much more responsive to the kettle temperature than to the base and/or heating element temperature.

As a further aid in this respect, an asbestos disc 82 is mounted beneath the heating plate 16 and a metal heat baffle plate 83 is mounted below the asbestos disc with bump arrangements 84 and 85 at spaced points to support the baffle 83 on the depressed portion 14 of the appliance base 10 and to support the disc 82 on the baffle.

When the kettle 22 is lowered into position for cooking, its wall 40 interferes with the ball 80 so that the spring 74 is affected and pushes the kettle to a position that centers it on the heating element and urges the diametrically opposite area of the wall 40 into good thermal contact with the bracket 36. The ball rolls during insertion and removal of the kettle to prevent wear of the kettle wall and to permit easy insertion and removal and yet assure rugged pressure against the heat conductor bracket. Also the disclosed design affords good pressure of the kettle against the heat conductor bracket even when light loads are present in the kettle. This arrangement is superior to a thermostat biased upwardly against the bottom of the kettle wherein a lightweight load such as a few buns will not be heavy enough to assure positive heat transfer from the kettle to the thermostat and may hold the kettle undesirably spaced throughout a portion of its area from the heating element itself.

Some changes may be made in the construction and arrangement of the parts of my thermostat for cookers without departing from the real spirit and purpose of my invention, and it is my intention to cover by my claims any modified forms of structure or use of mechanical equivalents which may be reasonably included within their scope.

I claim as my invention:

1. In a thermostat of the character disclosed, the combination with an appliance having a well-like base portion and a heating element on the bottom thereof, a kettle received in said base portion and supported on said heating element, a thermostat structure supported by said base portion exteriorly thereof and having a kettle contacting portion and a connecting portion extending through the side of said well-like portion to the exterior thereof but out of contact with said side and adapted to conduct heat from said kettle contacting portion to the operating mechanism of the thermostat, and means diametrically opposite said kettle-contacting portion for urging the kettle laterally across said heating element into contact with said kettle-contacting portion of said thermostat.

2. In a thermostat for a cooker having a double walled base, a thermostat structure mounted in the chamber formed by the walls of said base, an adjusting means for said thermostat extending through the outer double wall, a heating element for said appliance mounted in said base, a removable kettle adapted to be positioned on said heating element, and means for transferring temperature from said kettle through the inner double wall but out of contact therewith to said thermostat comprising a heat conductor bracket having a kettle contacting portion inside the inner wall and contacting at the side of the kettle, means for mounting said bracket on said base but with minimum contact therewith in order to minimize heat transmission from the base to the bracket, said means comprising shouldered ears at the ends of said bracket entering perforations in said inner wall, said thermostat being supported on said bracket for maximum heat transmission from said bracket to said thermostat, and means for biasing said kettle laterally across said heating element into good heat conducting contact with said heat conductor bracket.

3. In a thermostat of the character disclosed, the combination with an appliance having a well-like base portion and a heating element on the bottom thereof, a kettle received in said base portion and supported on said heating element, a thermostat structure supported by said base portion exteriorly thereof and having a kettle contacting portion and a connecting portion, said well-like base portion having an opening therein through which said connecting portion extends to the exterior thereof, said opening being larger than the cross-section of said connecting portion whereby said connecting portion is out of contact with said well-like portion, said connecting portion being adapted to conduct heat from said kettle-contacting portion to the operating mechanism of the thermostat, and means diametrically opposite said kettle-contacting portion for urging the kettle laterally across said heating element into contact with said kettle contacting portion of said thermostat.

References Cited in the file of this patent

UNITED STATES PATENTS

| Number | Name | Date |
|---|---|---|
| 1,956,067 | Herz | Apr. 24, 1934 |
| 2,168,158 | Hall | Aug. 1, 1939 |
| 2,170,681 | Finlayson | Aug. 22, 1939 |
| 2,175,727 | Graham | Oct. 10, 1939 |
| 2,209,832 | Schurig | July 30, 1940 |
| 2,424,161 | Gunther | July 15, 1947 |
| 2,430,196 | Vaughan | Nov. 4, 1947 |
| 2,522,718 | Huck | Sept. 19, 1950 |
| 2,528,579 | Clark | Nov. 7, 1950 |
| 2,573,237 | Wilcox | Oct. 30, 1951 |

FOREIGN PATENTS

| Number | Country | Date |
|---|---|---|
| 385,463 | Great Britain | Dec. 29, 1932 |
| 396,400 | Germany | May 30, 1924 |